(12) United States Patent
Ren et al.

(10) Patent No.: US 12,489,603 B2
(45) Date of Patent: Dec. 2, 2025

(54) MULTIPLICATION UNIT, NUMBER FIELD TRANSFORMATION CIRCUIT AND PRIVACY COMPUTATION DEVICE

(71) Applicant: ALIBABA (CHINA) CO., LTD., Zhejiang Province (CN)

(72) Inventors: Xuanle Ren, Shanghai (CN); Zhen Gu, Beijing (CN)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 265 days.

(21) Appl. No.: 18/322,339

(22) Filed: May 23, 2023

(65) Prior Publication Data

US 2024/0048352 A1 Feb. 8, 2024

(30) Foreign Application Priority Data

Aug. 2, 2022 (CN) .......................... 202210921931.X

(51) Int. Cl.
*H04L 9/00* (2022.01)
*G06F 7/544* (2006.01)
(Continued)

(52) U.S. Cl.
CPC ............ *H04L 9/008* (2013.01); *G06F 7/5443* (2013.01); *G06F 7/722* (2013.01); *G06F 17/14* (2013.01); *H04L 9/0618* (2013.01)

(58) Field of Classification Search
CPC ... H04L 9/00; H04L 9/06; H04L 9/008; H04L 9/0618; G06F 7/72; G06F 7/722; G06F 7/544; G06F 7/5443; G06F 17/14
See application file for complete search history.

(56) References Cited

U.S. PATENT DOCUMENTS 11,733,970 B2 * 8/2023 Nishizawa ........... G06N 3/0499
706/33
2021/0342277 A1 * 11/2021 Borgonovo ............. G06F 7/523

FOREIGN PATENT DOCUMENTS

KR 20160108861 A * 9/2016 ........... H04L 9/0618
TW 201329747 A * 7/2013 ........... G06F 17/141

OTHER PUBLICATIONS

"High-Speed VLSI Arithmetic Units: Adders and Multipliers"—Vojin G. Oklobdzija, UC Davis Electrical and Computer Engineering, Sep. 13, 1999 https://www.ece.ucdavis.edu/~vojin/CLASSES/EEC280/Lecture-Material/Arith-Chapter-v6.PDF (Year: 1999).*

(Continued)

*Primary Examiner* — Randy A Scott
(74) *Attorney, Agent, or Firm* — WPAT, P.C.; Anthony King

(57) ABSTRACT

A multiplication unit includes first, second, third and fourth receiving terminals, arithmetic units and multiplexers. In complex number mode, the first and second receiving terminals receive a real part value and an imaginary part value of a first complex number, respectively, whereas the third and fourth receiving terminals receive a real part value and an imaginary part value of a second complex number, respectively. In modulus mode, the first and third receiving terminals receive first and second integers, respectively. The multiplexers gate the arithmetic units to perform a complex number multiplication operation according to the first and second complex numbers to generate a third complex number in complex number mode and perform a modulus multiplication operation according to the first and second integers and a predetermined modulus to generate a third integer in modulus mode.

13 Claims, 9 Drawing Sheets

(51) Int. Cl.
*G06F 7/72* (2006.01)
*G06F 17/14* (2006.01)
*H04L 9/06* (2006.01)

(56) References Cited

OTHER PUBLICATIONS

"Multiplexer-Based Design of Adders/Subtractors and Logic Gates for Low Power VLSI Applications"—Boda et al., (IOSR-JVSP) vol. 5, Issue 6, Ver. II, Dec. 2015 https://www.researchgate.net/profile/Bahram-Rashidi/post/How_many_logic_gates_for_half_adder_and_full_adder/attachment/59d643f379197b807799f5.pdf (Year: 2015).*

* cited by examiner $t = 2^N$;
for ($m=1$; $m<n$; $m=2m$) do
$\quad t = \frac{N}{2}$;
$\quad$ for ($i=0$; $i<m$; $i++$) do
$\quad\quad j_1 = 2 \cdot i \cdot t$;
$\quad\quad j_2 = j_1 + t - 1$;
$\quad\quad S = \omega[m+i]$;
$\quad\quad$ for ($j=j_1$; $j<j_2$; $j++$) do
$\quad\quad\quad U = P1[j]$;
$\quad\quad\quad V = P1[j+t] \cdot S$;
$\quad\quad\quad P1[j] = U + V \bmod q$;
$\quad\quad\quad P1[j+t] = U - V \bmod q$;
Return P1

FIG. 2

MULTIPLICATION UNIT, NUMBER FIELD TRANSFORMATION CIRCUIT AND PRIVACY COMPUTATION DEVICE

CROSS-REFERENCE TO RELATED APPLICATIONS

This application claims priority of China application No. 202210921931.X, filed on Aug. 2, 2022, which is incorporated by reference in its entirety.

BACKGROUND OF THE PRESENT DISCLOSURE

Field of the Present Disclosure

The present disclosure relates to a multiplication unit and, more particularly, to a multiplication unit capable of performing complex number multiplication and modulus multiplication.

Description of the Prior Art

Artificial intelligence (AI) models, such as artificial neural networks, are useful to the development of plenty of industries by analyzing a huge amount of data and retrieving therefrom meaningful information. However, operation of AI models usually requires a large amount of expensive computation hardware resources, which are not affordable on the part of every company or research institute. In view of this, server service providers provide service of remote computations to enable more enterprises to acquire AI-based data analysis capability. The clients upload data to be computed or analyzed to the cloud, and the server service providers provide service of data computation remotely and finally send the computation results to the clients.

However, the data provided by the clients may be confidential, and thus the service may pose security risks. To enhance data security in the course of the service, homomorphic encryption technology is used to encrypt data. Homomorphic encryption allows computation service providers to perform a specific form of algebra computation on encrypted ciphertext. The result of decrypting the encrypted data generated by the algebra computation is identical to the result of performing the same algebra computation on the plaintext data. Thus, the computation service providers can directly perform a specific form of operation, such as linear computation, on ciphertext while being ignorant of the contents of plaintext data, so as to enhance the service security. Since the operation performed on ciphertext data is complicated, the computation service providers usually use fast Fourier transform or number theoretic transform to change the number field of ciphertext data and thereby simplify the operation performed on ciphertext data. However, fast Fourier transform and number theoretic transform inherently necessitate complicated operation and thus require related hardware to speed up operation. Furthermore, to process different types of encrypted data, a computation device has to support operation of fast Fourier transform and number theoretic transform simultaneously; as a result, the chip area of such computation device is large and thus fails to meet market needs. Therefore, it is imperative to provide the operation of fast Fourier transform and number theoretic transform efficiently.

SUMMARY OF THE PRESENT DISCLOSURE

A multiplication unit of the disclosure comprises a multiplexer for effectively using a plurality of multipliers to perform complex number multiplication operation and modulus multiplication operation to thereby enhance hardware utilization rate and reduce the required circuit area of the multiplication unit. Therefore, given the area-efficiency advantage, a number field transformation circuit of the disclosure is effective in using the multiplication unit of the disclosure to perform modulus multiplication required for complex number multiplication and number theoretic transform required for fast Fourier transform, thereby allowing a privacy computation device of the disclosure to receive different types of homomorphic encryption ciphertext, perform computation accordingly, and thus expand the scope of service of the privacy computation device.

BRIEF DESCRIPTION OF THE DRAWINGS

Persons skilled in the art can better understand various aspects of the disclosure by referring to the accompanying drawings and embodiments of the disclosure. In view of conventional standards and practice, the accompanying drawings are not drawn to scale. In fact, for the sake of illustration, the drawing scale of the accompanying drawings is adjustable as needed.

FIG. 2 is a schematic view of program codes for performing number field transform on $2^N$-dimensional polynomial.

DETAILED DESCRIPTION OF THE EMBODIMENTS

Figure 1:
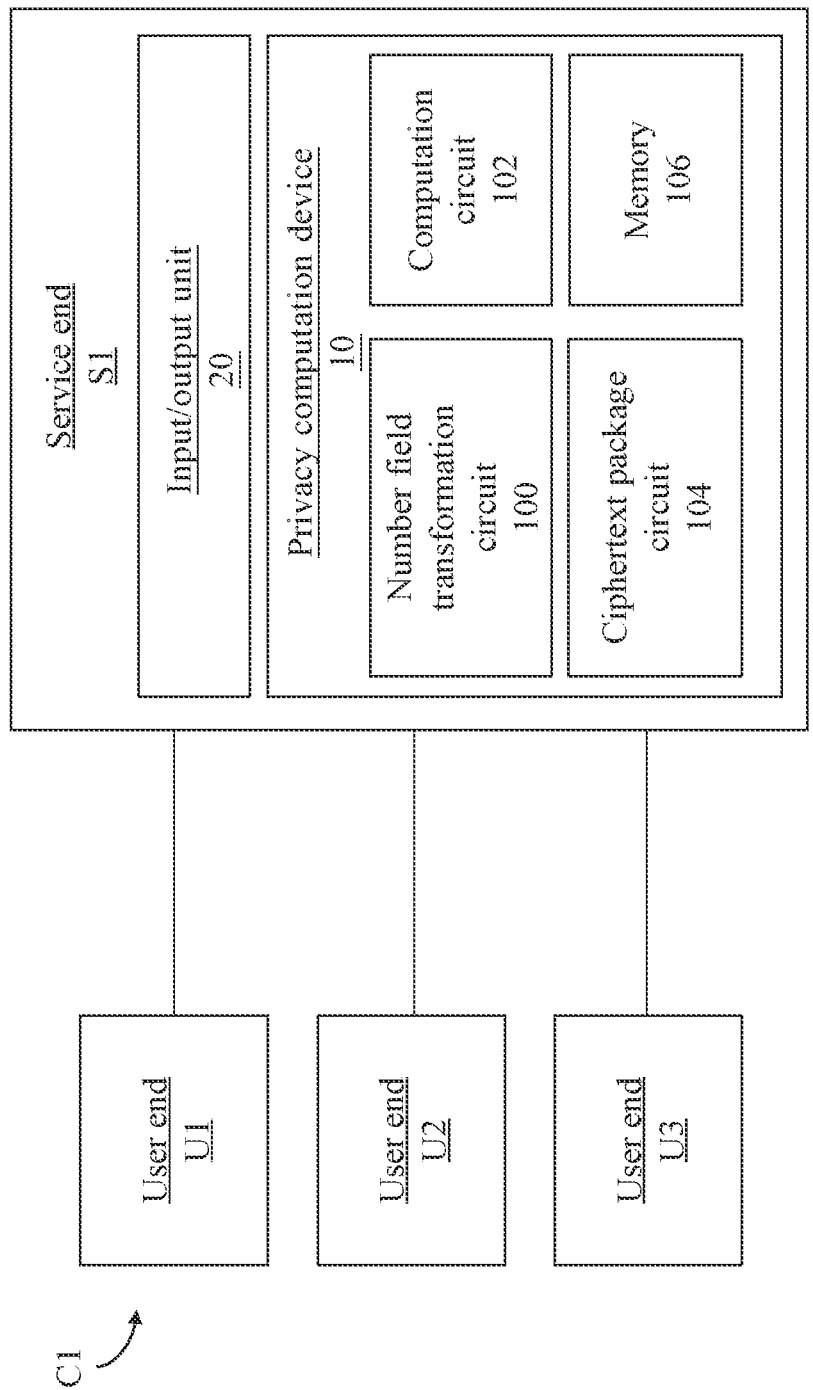
FIG. 1 is a schematic view of a homomorphic encryption computation system according to an embodiment of the disclosure.

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a schematic view of a homomorphic encryption computation system according to an embodiment of the disclosure. As shown in FIG. 1, the homomorphic encryption computation system C1 includes a user end U1 and a service end S1. The user end U1 can encrypt plaintext data to be computed into ciphertext according to homomorphic encryption technology supported by the homomorphic encryption computation system C1, and the service end S1 can use the privacy computation device 10 therein to compute the received ciphertext and send a generated computation result to the user end U1. Since the computation result of the privacy computation device 10 is still in the form of ciphertext, the user end U1 has to decrypt the received computation result in order to obtain a computation result in the form of plaintext data. Since the service end S1 can perform computation directly on the ciphertext data without decryption, it can preclude client data leaks and thus ensure client data privacy and security.

Since the ciphertext of homomorphic encryption is usually expressed in polynomials, computation of ciphertext can be intricate. For instance, multiplication of two M-dimensional polynomials entails performing $M^2$ times of coefficient multiplications, where M denotes an integer greater than 1. To speed up ciphertext computation, the privacy computation device 10 may include a number field transformation circuit 100 for performing number field transform on ciphertext. For instance, the number field transformation circuit 100 may perform fast Fourier transform (FFT) or number theoretic transform (NTT) on polynomials of ciphertext data to generate post-transform polynomials. Post-transform M-dimensional polynomials can be generated after the M-dimensional polynomials undergo the number field transform, and the post-transform M-dimensional polynomial multiplication only requires multiplying coefficients of the same term in order to obtain coefficients of the corresponding term. Therefore, upon completion of the number field transform, polynomial multiplication entails performing M times rather than $M^2$ times of coefficient multiplications.

FIG. 2 shows program codes for performing the number field transform on $2^N$-dimensional polynomial P1 according to Cooley's and Tukey's number theoretic transform algorithm, where N denotes an integer greater than 1. Referring to FIG. 2, q denotes a predetermined modulus. Execution of the algorithm in FIG. 2 on a $2^N$-dimensional polynomial P1 entails executing a first for-loop N rounds, executing a second for-loop each round by selecting a twiddle factor S from ($2^N$–1) predetermined twiddle factors $\omega[1]$~$w[2^N]$ and determining a number of modulus computations that the twiddle factor S should involve, and executing a third for-loop each round by selecting two corresponding coefficients in the current polynomial P1 and the twiddle factor S determined in the second for-loop to perform modulus computation and updating the coefficients of the corresponding terms in polynomial P1. Upon completion of the computation of the three for-loops, all the coefficients of polynomial P1 would be updated to become post-number-field-transform polynomial coefficients.

Figure 3:
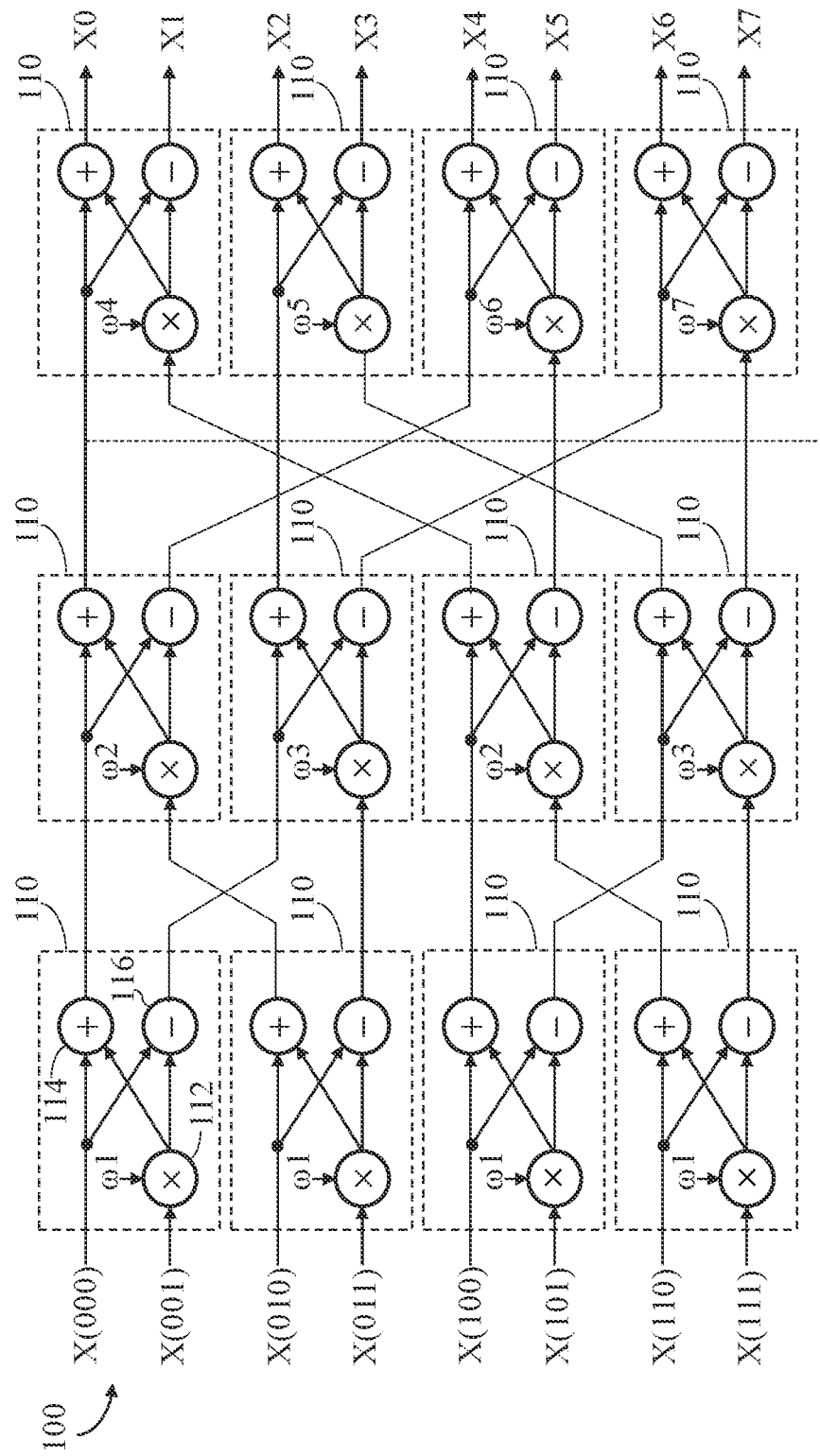
FIG. 3 is a schematic view of an embodiment of a number field transformation circuit of FIG. 1.

FIG. 3 is a schematic view of an embodiment of the number field transformation circuit 100. In the present embodiment, the number field transformation circuit 100 includes a plurality of butterfly computation units 110 for performing the computations in the third for-loop in FIG. 2. In the present embodiment, N is, for example, 3, and thus the number field transformation circuit 100 can transform eight coefficients X(000)~X(111) of an 8-dimensional polynomial into eight coefficients X0~X7 of a post-transform 8-dimensional polynomial.

Each butterfly computation unit 110 includes a multiplication unit 112, an adder 114 and a subtracter 116. Take the butterfly computation unit 110 at the upper left corner of FIG. 3 as an example, the butterfly computation unit 110 receives coefficient X(000) and coefficient X(001). The multiplication unit 112 multiplies coefficient X(001) by the predetermined twiddle factor $\omega1$. The adder 114 adds coefficient X(000) and the computation result of the multiplication unit 112 to generate a first intermediate value. The subtracter 116 subtracts the computation result of the multiplication unit 112 from coefficient X(000) to generate a second intermediate value. Then, the first intermediate value and the second intermediate value generated by the butterfly computation unit 110 are outputted to two other butterfly computation units 110 to undergo subsequent computation.

In the present embodiment, the number field transformation circuit 100 includes 12 butterfly computation units 110 to thereby perform three rounds of the computations of the first for-loop (shown in FIG. 2) in a pipelined manner, but the present disclosure is not limited thereto. In some embodiments, the number field transformation circuit 100 may use a plurality of the butterfly computation units 110 repeatedly, so as to reduce hardware requirements. For instance, the number field transformation circuit 100 comprises, for example, four butterfly computation units 110 and allocates the output result anew after the four butterfly computation units 110 have finished the previous round of computation of the first for-loop shown in FIG. 2, such that the four butterfly computation units 110 can proceed to perform the next round of computation of the first for-loop shown in FIG. 2. The subsequent rounds of computation of the first for-loop shown in FIG. 2 can be performed in a similar manner.

In the embodiment illustrated by FIG. 1, the privacy computation device 10 further includes a computation circuit 102 and a ciphertext package circuit 104. After the number field transformation circuit 100 has performed the number field transform on ciphertext polynomials, the computation circuit 102 can perform a corresponding computation on post-transform polynomials, and the computation result of the computation circuit 102 is packaged by the ciphertext package circuit 104 to generate the output ciphertext in compliant formats. Thus, after receiving the output ciphertext, the user end U1 can decrypt the output ciphertext to retrieve a computation result. The privacy computation device 10 further includes a random access memory (RAM) 106. The RAM 106 can store values, such as twiddle factors ω1~ω7, required for computation performed by the number field transformation circuit 100 and the computation circuit 102 and intermediate values temporarily stored in the course of computation. In some embodiments, the RAM 106 may be disposed in the transformation circuit 100 and/or the computation circuit 102.

In the embodiment illustrated by FIG. 2 and FIG. 3, the number field transformation circuit 100 can perform the number theoretic transform on the received polynomial coefficients. However, some types of homomorphic encryption technology may require that fast Fourier transform be performed on the received polynomial coefficients for the number field transformation, and some integrated types of homomorphic encryption technology may require that both number theoretic transform and fast Fourier transform be performed simultaneously. Therefore, to enable the privacy computation device 10 to support computation of different types of homomorphic encryption data, the number field transformation circuit 100 can also perform the fast Fourier transform on the received polynomial coefficients in the present embodiment.

For instance, as shown in FIG. 1, in the homomorphic encryption computation system C1, the service end S1 is adapted to provide computation service to the user ends U2, U3, while user ends U1, U2, U3 may use different types of homomorphic encryption technology to encrypt plaintext data. In the present embodiment, the user ends U1, U2 may use, for example, BFV algorithm or CKKS algorithm, to carry out homomorphic encryption, whereas the user end U3 may use, for example, TFHE algorithm, to carry out homomorphic encryption. In such case, when the service end S1 receives data ciphertext of the user end U1 or the user end U2, the privacy computation device 10 will have the number field transformation circuit 100 perform the number theoretic transform on the coefficients of ciphertext polynomials. Also, when the service end S1 receives data ciphertext of the user end U3, the privacy computation device 10 will have the number field transformation circuit 100 perform the fast Fourier transform on the coefficients of ciphertext polynomials.

In the present embodiment, the service end S1 may further includes an input/output unit 20. The input/output unit 20 controls the privacy computation device 10 to enable the number field transformation circuit 100 to perform the number theoretic transform or the fast Fourier transform according to the homomorphic encryption technology used by the user end U1, U2 and U3 and send the post-computation ciphertext to the user end U1, U2 or U3 upon completion of the ciphertext computation performed by the privacy computation device 10.

In addition, the fast Fourier transform algorithm and the number theoretic transform algorithm include similar computations. For instance, the number theoretic transform algorithm shown in FIG. 2 can substitute for the fast Fourier transform algorithm. Their major difference in in that: the polynomial P1 coefficients shown in FIG. 2 are integers when the number theoretic transform is performed while the polynomial P1 coefficients shown in FIG. 2 are complex numbers when the fast Fourier transform is performed. Correspondingly, the number field transformation circuit 100 performs modulus multiplication (i.e., the computation of the third for-loop in FIG. 2) on the integer coefficients of the polynomials during the number theoretic transform, and performs complex number multiplication on the complex number coefficients of the polynomials during the fast Fourier transform. That is, when the number field transformation circuit 100 needs to perform the number theoretic transform, the multiplication unit 112 enters a modulus mode to perform modulus multiplications on the received integers, and when the number field transformation circuit 100 needs to perform the fast Fourier transform, the multiplication unit 112 enters a complex number mode to perform complex number multiplications on the received complex numbers.

Figure 4:
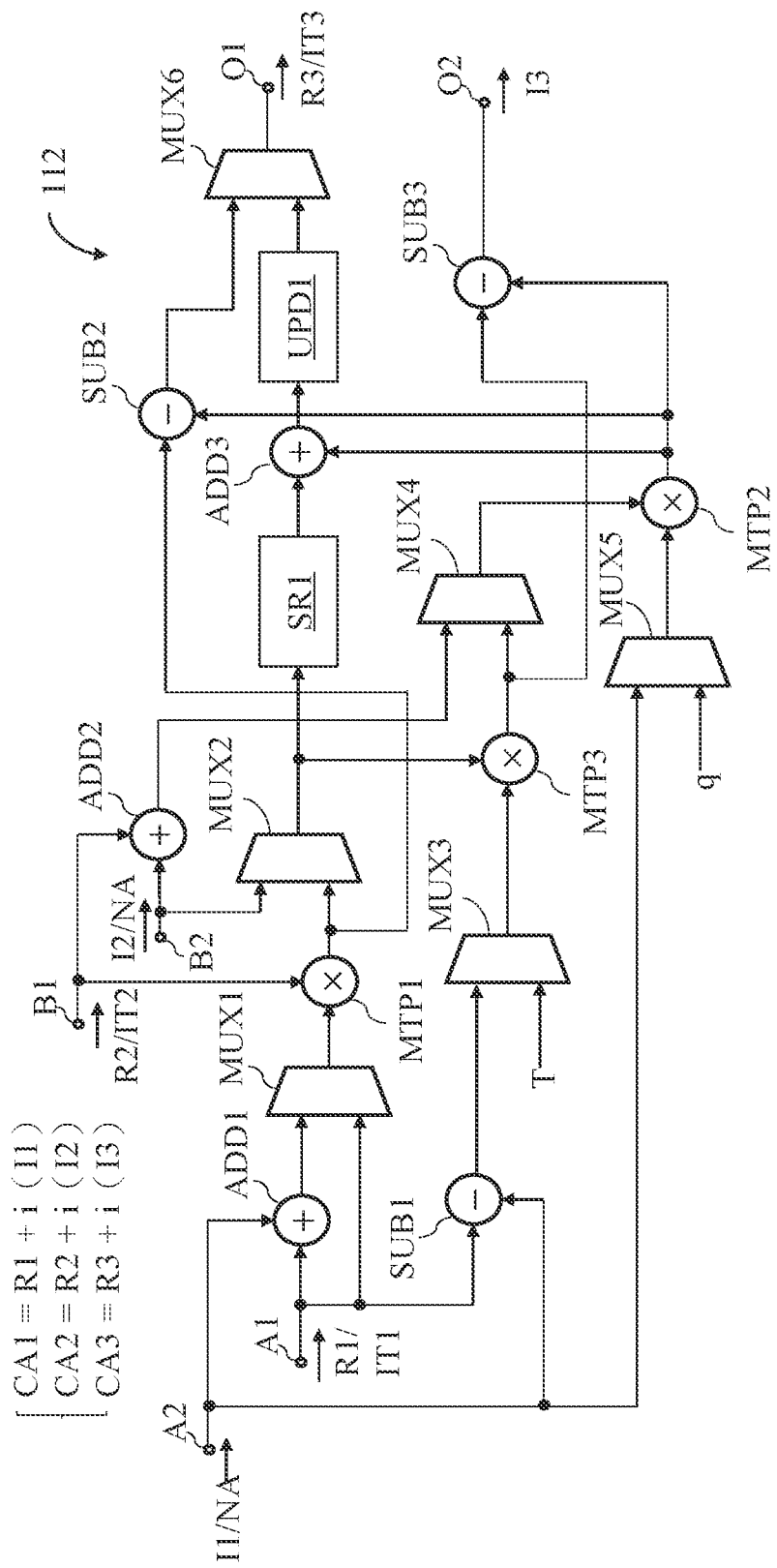
FIG. 4 is a schematic view of an embodiment of a multiplication unit of FIG. 3.

FIG. 4 is a schematic view of an embodiment of the multiplication unit 112 of the disclosure. The multiplication unit 112 includes a first receiving terminal A1, a second receiving terminal A2, a third receiving terminal B1, a fourth receiving terminal B2, a first output terminal O1 and a second output terminal O2. In the complex number mode, the first receiving terminal A1 receives a real part value R1 of a first complex number CA1, the second receiving terminal A2 receives an imaginary part value I1 of the first complex number CA1, the third receiving terminal B1 receives a real part value R2 of a second complex number CA2, and the fourth receiving terminal B2 receives an imaginary part value I2 of the second complex number CA2. Also, in the modulus mode, the first receiving terminal A1 receives a first integer IT1, the third receiving terminal B1 receives a second integer IT2, while the second receiving terminal A2 and the fourth receiving terminal B2 do not receive values or receive a redundant value NA.

The modulus multiplication of the integers IT1, IT2 can be accomplished by three instances of multiplication, using Barret's algorithm or Shoup's algorithm, for example. The complex number multiplication may require four instances of multiplication if multiplications among the real parts and imaginary parts of the complex numbers CA1, CA2 are carried out directly. However, consolidation of the real parts and imaginary parts of the complex numbers CA1, CA2 allows the complex number multiplication to be accomplished by only three instances of multiplication, as expressed by equation (1) through equation (4).

$$X1=(R1+I1){\times}R2 \qquad \text{Equation (1)}$$

$$X2=(R2+I2){\times}I1 \qquad \text{Equation (2)}$$

$$X3=(I1-R1){\times}I2 \qquad \text{Equation (3)}$$

$$CA3=(X1-X2)+i(X2-X3)=(R1{\times}R2-I1{\times}I2)+i(R2{\times}I1+R1{\times}I2) \qquad \text{Equation (4)}$$

X1, X2 and X3 in equation (1), equation (2) and equation (3) denote intermediate values for use in computation. In the present embodiment, since both the complex number multiplication and the modulus multiplication can be accomplished with three multipliers, to reduce hardware requirements and circuit area, the multiplication unit 112 may include a plurality of multiplexers for gating the data paths in different modes, so that a plurality of arithmetic units, including multipliers MTP1, MTP2 and MTP3, can perform complex number multiplication according to the first complex number CA1 and the second complex number CA2 to generate a third complex number CA3 in the complex number mode, and can perform modulus computations according to the first integer IT1, the second integer IT2 and the predetermined modulus q to generate a third integer IT3 in the modulus mode.

In the present embodiment, in the complex number mode, the first output terminal O1 outputs a real part value R3 of the third complex number CA3, and the second output terminal O2 outputs an imaginary part value I3 of the third complex number CA3; in the modulus mode, the first output terminal O1 outputs the third integer IT3 while the second output terminal O2 need not output any values. Owing to a plurality of multiplexers in the multiplication unit 112, the multiplication unit 112 can effectively and repeatedly use multipliers MTP1, MTP2 and MTP3 in the complex number mode and the modulus mode, thereby enhancing the hardware utilization rate and reducing the required circuit area of the multiplication unit 112. Furthermore, the number field transformation circuit 100 in the privacy computation device 10 includes a plurality of butterfly computation units 110 each including a multiplication unit 112, therefore, by reducing the required area of the multiplication unit 112, it can significantly reduce the required area of the number field transformation circuit 100 and the privacy computation device 10.

As shown in FIG. 4, the plurality of arithmetic units in the multiplication unit 112 further include, for example, an adder ADD1, an adder ADD2, an adder ADDS, a subtracter SUB1, a subtracter SUB2 and a subtracter SUB3. Furthermore, the multiplication unit 112 further includes a shift register SR1 and a data discriminator UPD1 required for modulus multiplication. In the present embodiment, the sub-multiplication unit 112 includes six multiplexers MUX1, MUX2, MUX3, MUX4, MUX5 and MUX6.

In the present embodiment, the multiplication unit 112 can perform the complex number multiplication according to equation (1) through equation (4), and perform the modulus multiplication according to the frequently used Barret's algorithm; also, the multiplication unit 112 can configure the multiplexers MUX1, MUX2, MUX3, MUX4, MUX5 and MUX6 accordingly to accomplish these two types of multiplication.

The multiplexer MUX1 has a first input terminal, a second input terminal and an output terminal. The first input terminal of the multiplexer MUX1 is coupled to the output terminal of the adder ADD1. The second input terminal of the multiplexer MUX1 is coupled to the first receiving terminal A1. The output terminal of the multiplexer MUX1 is coupled to a first input terminal of the first multiplier MTP1.

The multiplexer MUX3 has the first input terminal, a second input terminal and an output terminal. The first input terminal of the multiplexer MUX3 is coupled to an output terminal of the subtracter SUB1. The second input terminal of the multiplexer MUX3 receives a first predetermined value T required for mode multiplication. The output terminal of the multiplexer MUX3 is coupled to a second input terminal of the multiplier MTP3.

The multiplexer MUX4 has a first input terminal, a second input terminal and an output terminal. The first input terminal of the multiplexer MUX4 is coupled to an output terminal of the adder ADD2. The second input terminal of the multiplexer MUX4 is coupled to the output terminal of the multiplier MTP3. The output terminal of the multiplexer MUX4 is coupled to a first input terminal of the multiplier MTP2.

The multiplexer MUX5 has a first input terminal, a second input terminal and an output terminal. The first input terminal of the multiplexer MUX5 is coupled to the second receiving terminal A2. The second input terminal of the multiplexer MUX5 receives the predetermined modulus q required for modulus multiplication. The output terminal of the multiplexer MUX5 is coupled to a second input terminal of the multiplier MTP2.

The multiplexer MUX6 has a first input terminal, a second input terminal and an output terminal. The first input terminal of the multiplexer MUX6 is coupled to an output terminal of the subtracter SUB2. The second input terminal of the multiplexer MUX6 is coupled to an output terminal of the data discriminator UPD1. The output terminal of the multiplexer MUX6 outputs the real part value R3 of the third complex number CA3 in the complex number mode and outputs the third integer IT3 in the modulus mode.

The second input terminal of the multiplier MTP1 is coupled to the third receiving terminal B1. The adder ADD1 has a first input terminal, a second input terminal and an output terminal. The first input terminal of the adder ADD1 is coupled to the first receiving terminal A1. The second input terminal of the adder ADD1 is coupled to the second receiving terminal A2. The subtracter SUB1 has a first input terminal, a second input terminal and an output terminal. The first input terminal of the subtracter SUB1 is coupled to the first receiving terminal A1. The second input terminal of the subtracter SUB1 is coupled to the second receiving terminal A2. The adder ADD2 has a first input terminal, a second input terminal and an output terminal. The first input terminal of the adder ADD2 is coupled to the third receiving terminal B1. The second input terminal of the adder ADD2 is coupled to the fourth receiving terminal B2. The subtracter SUB2 has a first input terminal, a second input terminal and an output terminal. The first input terminal of the subtracter SUB2 is coupled to the output terminal of the multiplier MTP1. The second input terminal of the subtracter SUB2 is coupled to the output terminal of the multiplier MTP2. The subtracter SUB3 has a first input terminal, a second input terminal and an output terminal. The first input terminal of the subtracter SUB3 is coupled to the output terminal of the multiplier MTP3. The second input terminal of the subtracter SUB3 is coupled to the output terminal of the multiplier MTP2. The output terminal of the subtracter SUB3 outputs the imaginary part value I3 of the third complex number CA3 in the complex number mode. The adder ADD3 has a first input terminal, a second input terminal and an output terminal. The first input terminal of the adder ADD3 is coupled to an output terminal of the shift register SR1. The second input terminal of the adder ADD3 is coupled to the output terminal of the multiplier MTP2. The output terminal of the adder ADD3 is coupled to the input terminal of the data discriminator UPD1. An input terminal of the shift register SR1 is coupled to the output terminal of the multiplexer MUX2.

Figure 5:
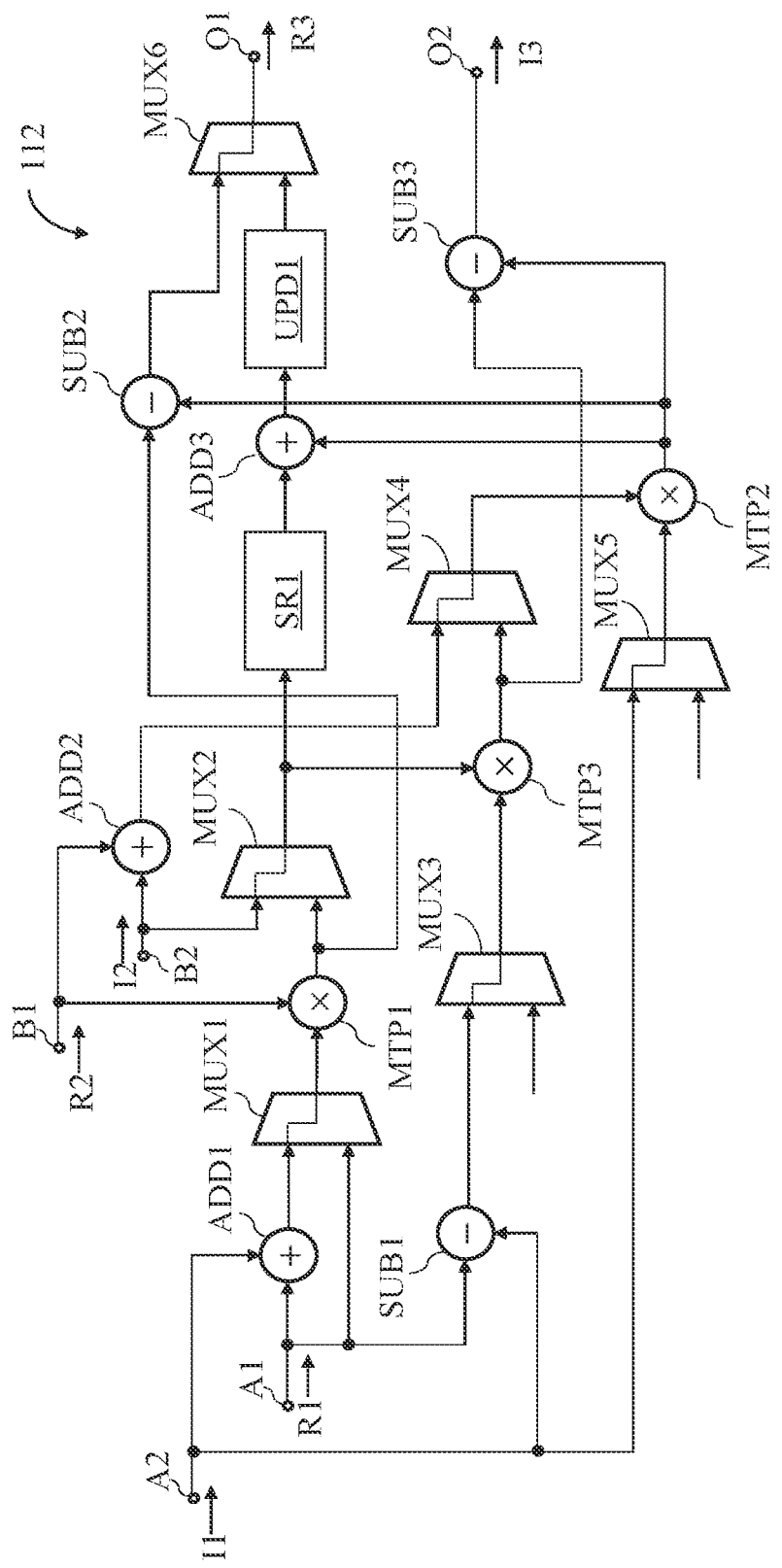
FIG. 5 is a schematic view of the multiplication unit operating in the complex number mode of FIG. 4.
Figure 6:
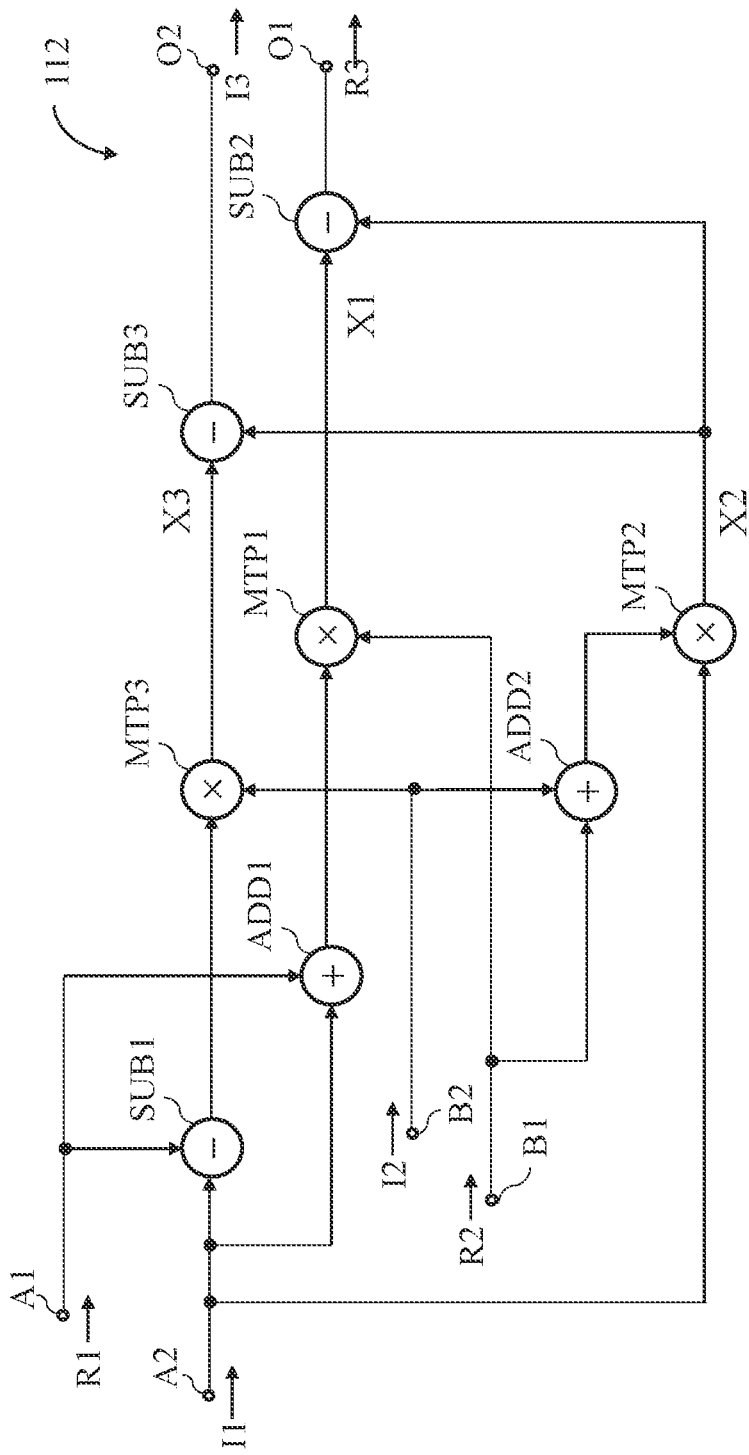
FIG. 6 is an equivalent circuit diagram of the multiplication unit operating in the complex number mode of FIG. 4.

In the complex number mode, the multiplexers MUX1, MUX2, MUX3, MUX4, MUX5 and MUX6 have the first input terminals thereof electrically connected to the output terminals thereof, respectively. FIG. 5 is a schematic view of the multiplication unit 112 operating in the complex number mode. FIG. 6 is an equivalent circuit diagram of the multiplication unit 112 operating in the complex number mode. As shown in FIG. 5 and FIG. 6, in the complex number mode, the adder ADD1 adds the real part value R1 of the first complex number CA1 and the imaginary part value I1 of the first complex number CA1, and the multiplier MTP1 multiplies the computation result of the adder ADD1 by the real part value R2 of the second complex number CA2 to generate the first intermediate value X1. The adder ADD2 adds the imaginary part value I2 and the real part value R2 of the second complex number CA2, and the multiplier MTP2 multiplies the computation result of the adder ADD2 by the imaginary part value I1 of the first complex number CA1 to generate the second intermediate value X2. The subtracter SUB1 subtracts the real part value R1 of the first complex number CA1 from the imaginary part value I1 of the first complex number CA1. The multiplier MTP3 multiplies the computation result of the subtracter SUB1 by the imaginary part value I2 of the second complex number CA2 to generate the third intermediate value X3. The subtracter SUB2 subtracts the second intermediate value X2 from the first intermediate value X1 to generate the real part value R3 of the third complex number CA3, and the subtracter SUB3 subtracts the third intermediate value X3 from the second intermediate value X2 to generate the imaginary part value I3 of the third complex number CA3.

Figure 7:
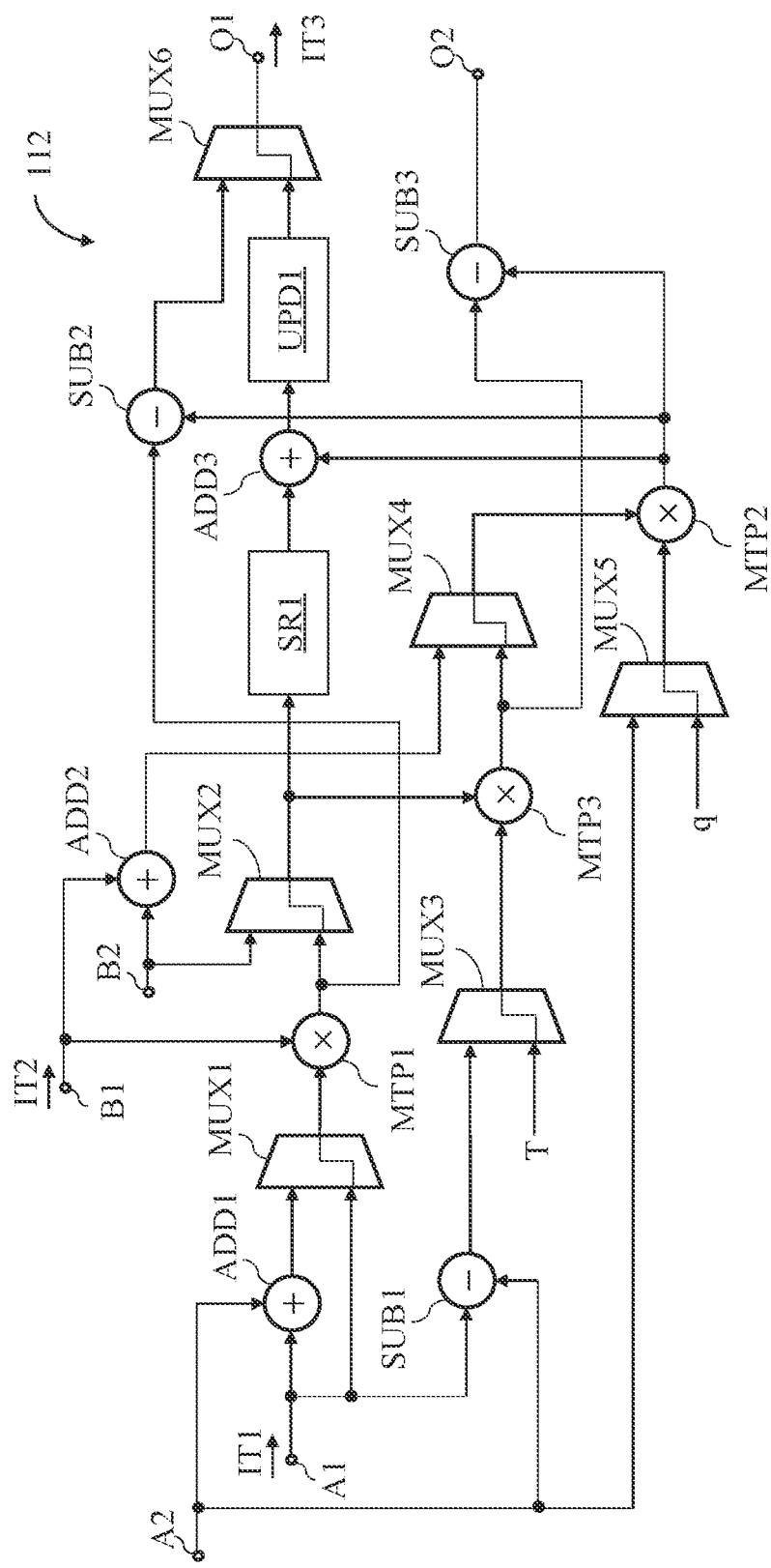
FIG. 7 is a schematic view of the multiplication unit operating in the modulus mode of FIG. 4.
Figure 8:
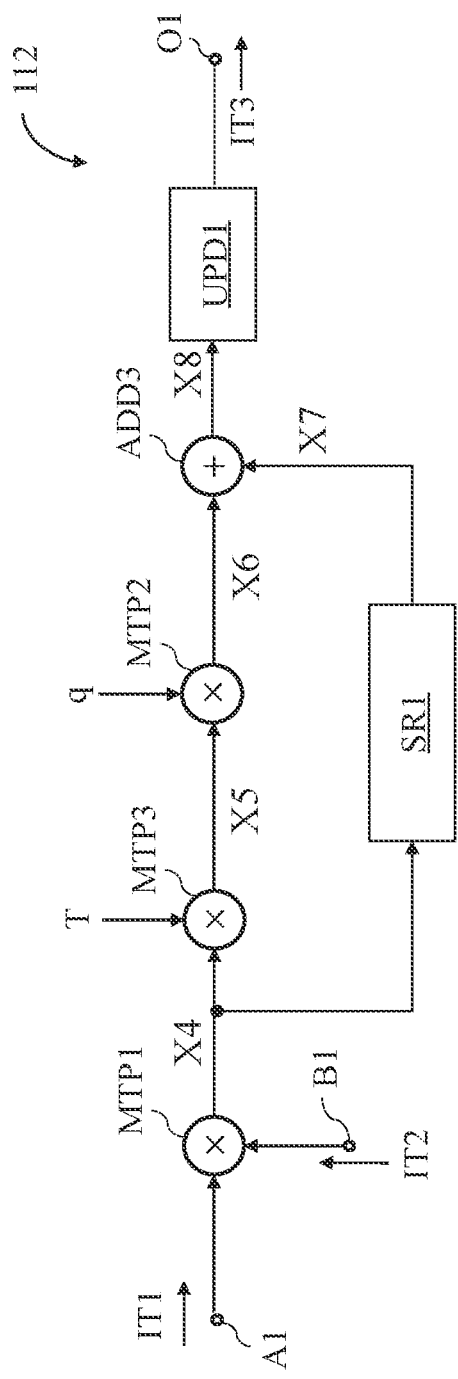
FIG. 8 is an equivalent circuit diagram of the multiplication unit operating in the modulus mode of FIG. 4.

In modulus mode, the multiplexers MUX1, MUX2, MUX3, MUX4, MUX5 and MUX6 have the second input terminals thereof electrically connected to the output terminals thereof, respectively. In the present embodiment, the multiplexers MUX1-MUX6 can gate the arithmetic units in the multiplication unit 112 to receive corresponding data according to Barret's algorithm, so as to perform the modulus multiplication operation on the first integer IT1 and the second integer IT2. FIG. 7 is a schematic view of the multiplication unit 112 operating in the modulus mode. FIG. 8 is an equivalent circuit diagram of the multiplication unit 112 operating in the modulus mode.

As shown in FIG. 7 and FIG. 8, in the modulus mode, the multiplier MTP1 multiplies the first integer IT1 by the second integer IT2 to generate a fourth intermediate value X4, the multiplier MTP3 multiplies the fourth intermediate value X4 by a first predetermined value T related to the predetermined modulus q to generate a fifth intermediate value X5, and the multiplier MTP2 multiplies the fifth intermediate value X5 by the predetermined modulus q to generate a sixth intermediate value X6. The shift register SR1 generates a seventh intermediate value X7 according to the fourth intermediate value X4. The adder ADD3 adds the difference resulting from the subtraction of the seventh intermediate value X7 from the sixth intermediate value X6 or the difference resulting from the subtraction of the seventh intermediate value X7 from the sixth intermediate value X6 and another predetermined value to generate an eighth intermediate value X8. The data discriminator UDP1 performs a subtraction of the predetermined modulus q from the eighth intermediate value X8 or a subtraction of two times the predetermined modulus q from the eighth intermediate value X8 to generate the third integer IT3, according to whether the eighth intermediate value X8 is greater than the predetermined modulus q or not.

In the present embodiment, the multiplexers MUX1-MUX6 are arranged in a pattern shown in FIG. 4, and can control the data transmission paths in the complex number mode and the modulus mode in ways shown in FIG. 5 and FIG. 7, but the disclosure is not limited thereto. In some other embodiments, the multiplication unit 112 may include multiplexers in any other numbers or multiplexers arranged in any other patterns as long as the multiplication unit 112 can control the data transmission paths in the complex number mode to allow the arithmetic units to perform computation equivalent to the one shown in FIG. 6 to thereby finish the complex number multiplication and controls the data transmission paths in the modulus mode to allow the arithmetic units to perform computation equivalent to the one shown in FIG. 8 to thereby finish the modulus multiplication. That is, the multiplication unit 112 can use the multiplexers to control the input/output data paths of the multipliers MTP1, MTP2 and MTP3 and the other arithmetic units; therefore, in different modes, the multipliers MTP1, MTP2 and MTP3 and the other arithmetic units can be reused to accomplish the complex number multiplication and the modulus multiplication.

In the present embodiment, the effective number of bits of the integers IT1, IT2 and the real part values R1, R2 and the imaginary part values I1, I2 of the complex numbers CA1, CA2 must be compatible with the number of bits supported by the multipliers MTP1, MTP2, MTP3 to ensure that the multipliers MTP1, MTP2, MTP3 can correctly perform computation in the two modes. Furthermore, in some embodiments, the subtracters SUB1, SUB2, SUB3 can have the same structure as the adder ADD1, ADD2, ADD3, and thus the subtracters SUB1, SUB2, SUB3 can be replaced by the adders to perform subtraction by adding the minuend with a complementary number of the subtrahend.

The multiplication unit 112 can switch between the complex number mode and the modulus mode to perform the complex number multiplication and the modulus multiplication accordingly. Therefore, the privacy computation device 10 enables, according to the homomorphic encryption technology used by the user end U1, U2 or U3, the multiplication unit 112 of each butterfly computation unit 110 of the number field transformation circuit 100 to enter the modulus mode to perform the number theoretic transform, or to enter the complex number mode to perform the fast Fourier transform. In addition, the multiplication unit 112 can reuse the multipliers MTP1, MTP2 and MTP3 while performing multiplication in different modes, thereby reducing the hardware requirements of the multiplication unit 112 and reducing the required circuit area of the multiplication unit 112.

Figure 9:
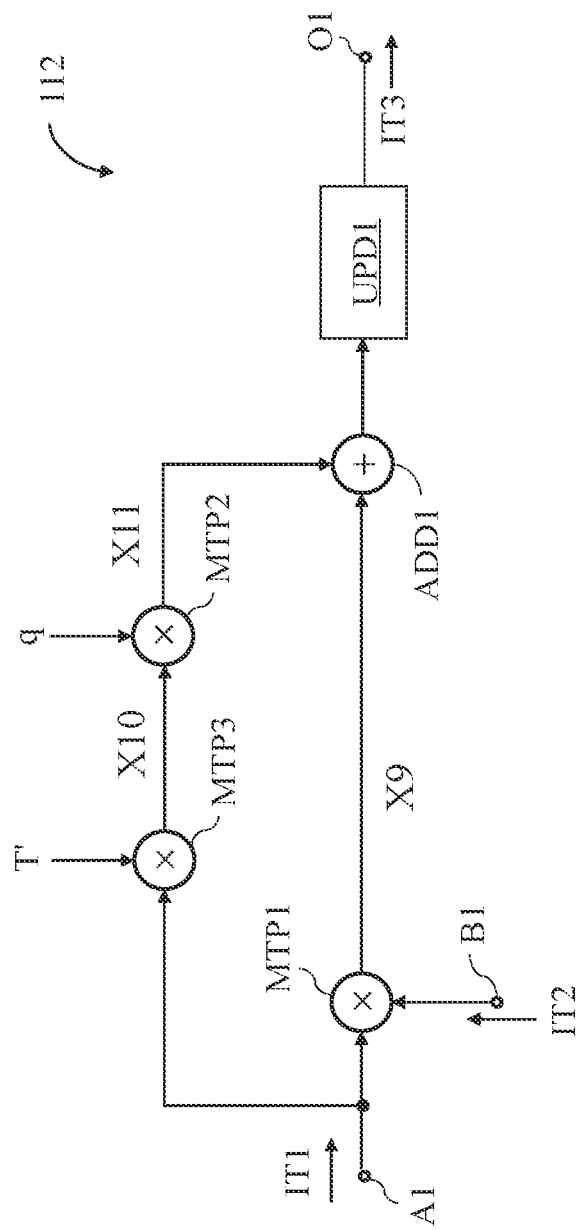
FIG. 9 is an equivalent circuit diagram of performing modulus multiplication according to Shoup's algorithm.

In the aforesaid embodiment, the multiplication unit 112 can perform the modulus multiplication according to Barret's algorithm; However, the disclosure is not limited thereto. In some embodiments, the multiplication unit 112 can also configure the arithmetic units to perform the modulus multiplication according to Shoup's algorithm, Montgomery's algorithm or any other appropriate algorithm. FIG. 9 is an equivalent circuit diagram of performing the modulus multiplication according to Shoup's algorithm. As shown in FIG. 9, the multiplication unit 112 uses the multipliers MTP1, MTP2 and MTP3 to perform the modulus multiplication.

The multiplier MTP1 multiplies the first integer IT1 by the second integer IT2 to generate a ninth intermediate value X9. The multiplier MTP2 multiplies the first integer IT1 by a third predetermined value T' generated according to the predetermined modulus q to generate a tenth intermediate value X10. The multiplier MTP3 multiplies a tenth intermediate value X10 by the predetermined modulus q to generate an eleventh intermediate value X11. Furthermore, the subtracter SUB1 subtracts the eleventh intermediate value X11 from the ninth intermediate value X9, and the data discriminator UDP1 can subtract the predetermined modulus q from the eleventh intermediate value X11 to generate the third integer IT3 when the eleventh intermediate value X11 is greater than or equal to the predetermined modulus q, and output the eleventh intermediate value X11 as the third integer IT3 when the eleventh intermediate value X11 is less than the predetermined modulus q.

In the present embodiment, the multiplication unit 112 not only controls the data transmission paths in the complex number mode to enable the arithmetic units to perform the computations equivalent to those shown in FIG. 6 to accomplish the complex number multiplication but also controls the data transmission paths through the corresponding multiplexers in the modulus mode to enable the arithmetic units to perform the computations equivalent to those shown in FIG. 9 to accomplish the modulus multiplication. As a result, the multiplication unit 112 may still reuse the multipliers MTP1, MTP2 and MTP3 in the complex number mode and the modulus mode, so as to make good use of the hardware in the multiplication unit 112 and reduce the overall required circuit area.

In summary, a multiplication unit of the disclosure uses a plurality of multipliers efficiently and repeatedly through multiplexers to perform the complex number multiplication and the modulus multiplication to thereby effectively enhance hardware utilization rate and reduce the required circuit area of the multiplication unit. Therefore, given the area-efficiency advantage, a number field transformation circuit of the disclosure is effective in using the multiplication unit of the disclosure to perform modulus multiplication required for fast number theoretic transform and complex number multiplication required for fast Fourier transform, thereby allowing a privacy computation device of the disclosure to receive different types of homomorphic encryption ciphertext, perform computations accordingly, and thus expand the scope of service of the privacy computation device.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A multiplication unit, for performing a complex number multiplication operation on a first complex number and a second complex number in a complex number mode and performing a modulus multiplication operation on a first integer and a second integer in a modulus mode, the multiplication unit comprising:
   a first receiving terminal configured to receive a real part value of the first complex number in the complex number mode and receive the first integer in the modulus mode;
   a second receiving terminal configured to receive an imaginary part value of the first complex number in the complex number mode;
   a third receiving terminal configured to receive a real part value of the second complex number in the complex number mode and receive the second integer in the modulus mode;
   a fourth receiving terminal configured to receive an imaginary part value of the second complex number in the complex number mode;
   a plurality of arithmetic units comprising a first multiplier, a second multiplier and a third multiplier; and
   a plurality of multiplexers configured to gate the plurality of arithmetic units to perform computations according to the first complex number and the second complex number so as to generate a third complex number in the complex number mode and gate the plurality of arithmetic units to perform computations according to the first integer, the second integer and a predetermined modulus so as to generate a third integer in the modulus mode;
   wherein the arithmetic units comprise:
   a first adder having a first input terminal coupled to the first receiving terminal, a second input terminal coupled to the second receiving terminal, and an output terminal;
   a first subtracter having a first input terminal coupled to the first receiving terminal, a second input terminal coupled to the second receiving terminal, and an output terminal;
   a second adder having a first input terminal coupled to the third receiving terminal, a second input terminal coupled to the fourth receiving terminal, and an output terminal;
   a second subtracter having a first input terminal coupled to an output terminal of the first multiplier, a second input terminal coupled to an output terminal of the second multiplier, and an output terminal;
   a third subtracter having a first input terminal coupled to an output terminal of the third multiplier, a second input terminal coupled to the output terminal of the second multiplier, and an output terminal configured to output an imaginary part value of the third complex number in the complex number mode;
   a shift register;
   a data discriminator; and
   a third adder having a first input terminal coupled to the shift register, a second input terminal coupled to the output terminal of the second multiplier, and an output terminal coupled to an input terminal of the data discriminator;
   wherein the plurality of multiplexers comprise:
   a first multiplexer having a first input terminal coupled to the output terminal of the first adder, a second input terminal coupled to the first receiving terminal, and an output terminal coupled to a first input terminal of the first multiplier;
   a second multiplexer having a first input terminal coupled to the fourth receiving terminal, a second input terminal coupled to the output terminal of the first multiplier, and an output terminal coupled to a first input terminal of the third multiplier;
   a third multiplexer having a first input terminal coupled to the output terminal of the first subtracter, a second input terminal configured to receive a first predetermined value, and an output terminal coupled to a second input terminal of the third multiplier;
   a fourth multiplexer having a first input terminal coupled to the output terminal of the second adder, a second input terminal coupled to the output terminal of the third multiplier, and an output terminal coupled to a first input terminal of the second multiplier;
   a fifth multiplexer having a first input terminal coupled to the second receiving terminal, a second input terminal configured to receive the predetermined modulus, and an output terminal coupled to a second input terminal of the second multiplier; and
   a sixth multiplexer having a first input terminal coupled to the output terminal of the second subtracter, a second input terminal coupled to an output terminal of the data discriminator, and an output terminal configured to output a real part value of the third complex number in the complex number mode and output the third integer in the modulus mode;

wherein a second input terminal of the first multiplier is coupled to the third receiving terminal.

2. The multiplication unit of claim 1, wherein in the complex number mode,
the first adder is configured to add the real part value of the first complex number and the imaginary part value of the first complex number;
the first multiplier is configured to multiply a computation result of the first adder by the real part value of the second complex number to generate a first intermediate value;
the second adder is configured to add the imaginary part value and the real part value of the second complex number;
the second multiplier is configured to multiply a computation result of the second adder by the imaginary part value of the first complex number to generate a second intermediate value;
the first subtracter is configured to subtract the real part value of the first complex number from the imaginary part value of the first complex number;
the third multiplier is configured to multiply a computation result of the first subtracter by the imaginary part value of the second complex number to generate a third intermediate value;
the second subtracter is configured to subtract the second intermediate value from the first intermediate value to generate the real part value of the third complex number; and
the third subtracter is configured to subtract the third intermediate value from the second intermediate value to generate the imaginary part value of the third complex number.

3. The multiplication unit of claim 2, wherein, in the modulus mode, the plurality of multiplexers gate the plurality of arithmetic units to receive data according to Barret's algorithm for performing the modulus multiplication operation on the first integer and the second integer.

4. The multiplication unit of claim 3, wherein in the modulus mode:
the first multiplier is further configured to multiply the first integer by the second integer to generate a fourth intermediate value;
the third multiplier is further configured to multiply the fourth intermediate value by the first predetermined value related to the predetermined modulus to generate a fifth intermediate value;
the second multiplier is further configured to multiply the fifth intermediate value by the predetermined modulus to generate a sixth intermediate value;
the shift register is configured to generate a seventh intermediate value according to the fourth intermediate value;
the third adder is configured to add a difference resulting from the subtraction of a seventh intermediate value from the sixth intermediate value or a difference resulting from the subtraction of the seventh intermediate value from the sixth intermediate value to a second predetermined value to generate an eighth intermediate value; and
the data discriminator is configured to perform subtraction of the predetermined modulus or two times the predetermined modulus from the eighth intermediate value to generate the third integer, according to whether the eighth intermediate value is greater than the predetermined modulus or not.

5. The multiplication unit of claim 1, wherein:
in the complex number mode, the first multiplexer, the second multiplexer, the third multiplexer, the fourth multiplexer, the fifth multiplexer and the sixth multiplexer have the first input terminals thereof electrically connected to the output terminals thereof, respectively; and
in the modulus mode, the first multiplexer, the second multiplexer, the third multiplexer, the fourth multiplexer, the fifth multiplexer and the sixth multiplexer have the second input terminals thereof electrically connected to the output terminals thereof, respectively.

6. The multiplication unit of claim 2, wherein, in the modulus mode, the plurality of multiplexers gate the plurality of arithmetic units to receive data according to Shoup's algorithm for performing the modulus multiplication operation on the first integer and the second integer.

7. The multiplication unit of claim 6, wherein the plurality of arithmetic units further comprise a data discriminator, and in the modulus mode:
the first multiplier is further configured to multiply the first integer by the second integer to generate a ninth intermediate value;
the second multiplier is further configured to multiply the first integer by a third predetermined value generated according to the predetermined modulus to generate a tenth intermediate value;
the third multiplier is further configured to multiply the tenth intermediate value by the predetermined modulus to generate an eleventh intermediate value;
the first subtracter is further configured to subtract the eleventh intermediate value from the ninth intermediate value; and
the data discriminator is configured to perform subtraction of the predetermined modulus from the eleventh intermediate value to generate the third integer when the eleventh intermediate value is greater than or equal to the predetermined modulus.

8. The multiplication unit of claim 2, wherein, in the modulus mode, the plurality of multiplexers gate the plurality of arithmetic units to receive data according to Montgomery's algorithm for performing the modulus multiplication operation on the first integer and the second integer.

9. The multiplication unit of claim 1, further comprising:
a first output terminal for outputting the real part value of the third complex number in the complex number mode and outputting the third integer in the modulus mode; and
a second output terminal for outputting the imaginary part value of the third complex number in the complex number mode.

10. A number field transformation circuit, for performing fast Fourier transform or number theoretic transform on a plurality of input coefficients according to a plurality of twiddle factors predetermined to generate a plurality of output coefficients, the number field transformation circuit comprising a plurality of butterfly computation units, each butterfly computation unit comprising:
a multiplication unit for performing a complex number multiplication operation on a first complex number and a second complex number in a complex number mode and performing a modulus multiplication operation on a first integer and a second integer in a modulus mode, and receiving a first coefficient and a second coefficient to use the first coefficient as the first complex number and use a first twiddle factor in the plurality of twiddle factors as the second complex number in the complex number mode and to use the first coefficient as the first integer and use the first twiddle factor in the plurality of twiddle factors as the second integer in the modulus mode, wherein the multiplication unit comprises:
a first receiving terminal configured to receive a real part value of the first complex number in the complex number mode and receive the first integer in the modulus mode;
a second receiving terminal configured to receive an imaginary part value of the first complex number in the complex number mode;
a third receiving terminal configured to receive a real part value of the second complex number in the complex number mode and receive the second integer in the modulus mode;
a fourth receiving terminal configured to receive an imaginary part value of the second complex number in the complex number mode;
a plurality of arithmetic units comprising a first multiplier, a second multiplier and a third multiplier; and
a plurality of multiplexers configured to gate the plurality of arithmetic units to perform computations according to the first complex number and the second complex number so as to generate a third complex number in the complex number mode and gate the plurality of arithmetic units to perform computations according to the first integer, the second integer and a predetermined modulus so as to generate a third integer in the modulus mode, wherein the arithmetic units comprise:
a first adder having a first input terminal coupled to the first receiving terminal, a second input terminal coupled to the second receiving terminal, and an output terminal;
a first subtracter having a first input terminal coupled to the first receiving terminal, a second input terminal coupled to the second receiving terminal, and an output terminal;
a second adder having a first input terminal coupled to the third receiving terminal, a second input terminal coupled to the fourth receiving terminal, and an output terminal;
a second subtracter having a first input terminal coupled to an output terminal of the first multiplier, a second input terminal coupled to an output terminal of the second multiplier, and an output terminal;
a third subtracter having a first input terminal coupled to an output terminal of the third multiplier, a second input terminal coupled to the output terminal of the second multiplier, and an output terminal configured to output an imaginary part value of the third complex number in the complex number mode;
a shift register;
a data discriminator; and
a third adder having a first input terminal coupled to the shift register, a second input terminal coupled to the output terminal of the second multiplier, and an output terminal coupled to an input terminal of the data discriminator;
a fourth adder configured to add the second coefficient and a computation result of the multiplication unit; and a fourth subtracter configured to subtract the computation result of the multiplication unit from the second coefficient;
wherein the plurality of multiplexers comprise:
a first multiplexer having a first input terminal coupled to the output terminal of the first adder, a second input terminal coupled to the first receiving terminal, and an output terminal coupled to a first input terminal of the first multiplier;
a second multiplexer having a first input terminal coupled to the fourth receiving terminal, a second input terminal coupled to the output terminal of the first multiplier, and an output terminal coupled to a first input terminal of the third multiplier;
a third multiplexer having a first input terminal coupled to the output terminal of the first subtracter, a second input terminal configured to receive a first predetermined value, and an output terminal coupled to a second input terminal of the third multiplier;
a fourth multiplexer having a first input terminal coupled to the output terminal of the second adder, a second input terminal coupled to the output terminal of the third multiplier, and an output terminal coupled to a first input terminal of the second multiplier;
a fifth multiplexer having a first input terminal coupled to the second receiving terminal, a second input terminal configured to receive the predetermined modulus, and an output terminal coupled to a second input terminal of the second multiplier; and
a sixth multiplexer having a first input terminal coupled to the output terminal of the second subtracter, a second input terminal coupled to an output terminal of the data discriminator, and an output terminal configured to output a real part value of the third complex number in the complex number mode and output the third integer in the modulus mode;
wherein a second input terminal of the first multiplier is coupled to the third receiving terminal.

11. The number field transformation circuit of claim 10, wherein the number field transformation circuit is further configured to have the multiplication unit enters the complex number mode to perform the fast Fourier transform and enters the modulus mode to perform the number theoretic transform.

12. A number field transformation circuit of claim 10, including a privacy computation device, for performing computation on data having undergone homomorphic encryption.

13. The number field transformation circuit of claim 10, wherein the privacy computation device has the multiplication unit in the number field transformation circuit enter the modulus mode to perform number theoretic transform upon receiving data encrypted according to a BFV algorithm or a CKKS algorithm, and has the multiplication unit in the number field transformation circuit enter the complex number mode to perform fast Fourier transform upon receiving data encrypted according to a TFHE algorithm.

* * * * *